United States Patent Office 3,211,676
Patented Oct. 12, 1965

3,211,676
COMPOSITION COMPRISING POLYVINYL CHLORIDE AND HEXAMETHOXYMETHYL MELAMINE
Frank R. Spencer, Stamford, Conn., assignor to American Cyanamid Company, Stamford, Conn., a corporation of Maine
No Drawing. Filed June 11, 1962, Ser. No. 201,291
6 Claims. (Cl. 260—2.5)

This invention relates to novel compositions capable of being formed into clear, transparent, tough, smooth and flexible articles. More particularly, this invention relates to novel compositions comprising a vinyl chloride polymer in admixture with from about 50% to 150%, by weight, based on the weight of the vinyl chloride polymer, of hexamethoxymethyl melamine. Still more particularly, this invention relates to plastisols and organosols of vinyl chloride polymer-hexamethoxymethyl melamine compositions which are capable of being formed into clear, transparent, flexible materials, such as films and the like. Further, this invention relates to hard, cellular, expanded products produced from a vinyl chloride polymer-hexamethoxymethyl melamine composition and to a novel process for the production thereof.

One of the objects of the present invention is to provide compositions capable of being formed into clear, transparent, tough, smooth and flexible articles. Another object of the present invention is to provide novel compositions comprising a vinyl chloride polymer in admixture with from about 50% to about 150%, by weight, based on the weight of the vinyl chloride polymer, of hexamethoxymethyl melamine; which compositions are capable of being formed into clear, transparent, tough, smooth and flexible articles. A further object of the present invention is to provide plastisols and organosols of vinyl chloride polymerhexamethoxymethyl melamine compositions. Another object of the present invention is to provide a method for the production of hard, cellular, expanded products produced from poly(vinyl chloride)-hexamethoxymethyl melamine compositions and the products produced thereby.

These and further objects of the present invention will become more apparent to those skilled in the art upon reading the more detailed description set forth hereinbelow.

I have found that new and novel compositions can be produced by physically admixing a vinyl chloride polymer with from about 50% to 150%, preferably 75% to 125%, based on the weight of the vinyl chloride polymer, of hexamethoxymethyl melamine. The compositions are capable of being formed into various articles which possess characteristics conducive to their use as furniture and wall coverings, surface coatings, adhesives, and the like and which are clear, transparent and of any desired flexibility. The flexibility and durability of these articles also enable the novel compositions of this invention to be used for piping and as toys; fields wherein flexibility and durability are necessary.

I have found that, although many amino compounds such as triallylamine, hexaallyl melamine and triacrylyl 1,3,5-hexhydro-s-triazine are essentially immiscible with vinyl chloride polymers, hexamethoxymethyl melamine is very compatible therewith and additionally renders the poly(vinyl chloride) resin adaptable to the production of the articles discussed above. The use of the hexamethoxymethyl melamine as the plasticizer in my novel compositions enables the use of much less poly(vinyl chloride) than is generally necessary utilizing commercially available plasticizers. The compositions of my invention are nevertheless, comparative to commercially available products and additionally, the hexamethoxymethyl melamine aids in the production of products which have excellent resistance to hydrocarbon solvents. Of additional importance, is the latent reactivity of the hexamethoxymethyl melamine plasticizer which allows compositions containing it to be hardened into thermoset polymers. After the desired articles have been formed by molding, extruding, casting, etc., the articles may be made thermoset by polymerizing the hexamethoxymethyl melamine content thereof. This unique feature affords basis for my novel foaming process, discussed more fully hereinbelow. Additionally, I have found that the above-mentioned poly(vinyl chloride)-hexamethoxymethyl melamine compositions may be formed into plastisols or organosols; compositions which also form a part of the present invention.

Plastisols are dispersions of finely divided resins in which the dispersion medium consists of a non-volatile plasticizer. Generally they consist of fluid to pasty compositions which can be spread, dipped, injected, extruded, foamed or cast etc. and converted, at elevated temperature, into various products. They are prepared by physically mixing the resin and plasticizer in, for example, a three-roll mill. The milling procedure not only promotes dispersion of the additives but also serves to reduce the size of the resin agglomerates, decrease viscosity and improve texture.

The properties of the finished plastisol are generally dependent upon the ratio of plasticizer to resin and upon the properties of the plasticizer itself. The viscosity, density, wetting properties and plasticizing efficiency of the plasticizer are of great importance when consideration is being given to the use of any given compound as such.

Organosols, on the other hand, are dispersions of resins, in the form of finely divided particles, in a dispersion medium which also contains a volatile dispersant and/or a diluent compound. They are applied and used in the same manner as the plastisols, however, it is first necessary to evaporate the volatiles contained therein before a finished product can be produced. Dispersnts are polar compounds which form strong attachments to the resin, thereby aiding in the wetting and the dispersion of the resin.

Diluents are usually aromatic or aliphatic hydrocarbons and are used to balance and modify the swelling and wetting characteristics of the dispersants and to lower the cost and viscosity of the liquid medium. Organosols can be prepared in the same manner as described above in regard to plastisols and may also have incorporated therewith the same extraneous additives.

THE POLYMERS OF VINYL CHLORIDE

The vinyl chloride polymers employed in the present invention are essentially vinyl chloride polymers prepared by methods well known to those skilled in the art. However, in as much as commercially available polymeric vinyl chloride resins may be produced containing trace amounts, i.e. up to about 2% of copolymeric material, resins of this sort are also applicable in the present invention. Commercially available vinyl chloride polymers may also contain about 1%, or less, or other constituents such as vinyl acetate and the like, in copolymeric form. However, since these trace amounts of copolymeric material do not substantially alter the properties of the vinyl chloride polymer, it is to be understood that these types of materials are well within the scope of the present invention, and are therefore useful for producing the novel compositions etc. set forth herein.

THE HEXAMETHOXYMETHYL MELAMINE

Polymethyl ethers of polymethylol melamines, and the processes for preparing them, are well known in the art, see specifically U.S. Patents 2,918,452, 2,998,410 and 2,998,411.

The hexamethoxymethyl melamine constituent of the novel compositions claimed and disclosed herein are however, very difficult to prepare in a pure state. In the known processes for preparing this highly etherified, highly methylolated melamine, the analysis of the final product tends to indicate that the average methylolation is less than hexamethylol melamine. Likewise, the average degree of methylation appears to be less than the hexamethyl ether. Nevertheless, these products are deemed to contain a preponderance of the hexamethoxymethyl melamine compound and lesser amounts of such materials as the tetramethyl ether of tetramethylol melamine, the tetramethyl ether of pentamethylol melamine, the tetramethyl ether of hexamethylol melamine, the pentamethyl ether of pentamethylol melamine and the pentamethyl ether of hexamethylol melamine. It is to be understood, therefore, that wherever hexamethoxymethyl melamine is referred to herein, those compositions which contain melamine derivatives that are, on an average, not fully methylolated or fully methylated, but which approach such full methylolation and etherification, are incompassed and are substantially equivalent to pure hexamethoxymethyl melamine. Hexamethoxymethyl melamine is a monomeric material but is potentially a resin-forming material and can interreact with itself and other monomeric materials, such as those containing a terminal hydroxy group. This feature of hexamethoxymethyl melamine comes into focus especially in the preparation of the hard, cellular, foamed articles more completely described hereinbelow.

THE POLY(VINYL CHLORIDE)-HEXAMETHOXY-METHYL MELAMINE COMPOSITIONS

The novel compositions of the present invention are produced by physically blending poly(vinyl chloride) with from about 50% to 150%, by weight, based on the weight of the poly(vinyl chloride), of hexamethoxy methyl melamine. Although, any known blending technique may be employed, it is preferred that the physical blending of the components be carried out by utilizing procedures known to those skilled in the resin art, such as, for example, a two-roll rubber mill, a pebble mill, a ball mill or the like. Additionally, they may also be produced by dissolving, extruding, foaming, molding, etc., or by using other known plastisol techniques. Utilizing these types of blending techniques, uniform, thoroughly mixed compositions are produced which can then be transformed into various articles having the unique properties set forth hereinabove and more specifically enumerated in the following examples.

It is also within the scope of the present invention to incorporate into the poly(vinyl chloride)-hexamethoxymethyl melamine compositions, various compatible dispersants and/or diluents in order to produce other novel plastisols and organosols. Generally, sufficient dispersant and/or diluent should be added to the poly(vinyl chloride)-hexamethoxymethyl melamine admixture so as to create a resin content in the dispersion of from about 30% to 50%, by weight, with a total solids content, including pigments, etc., of from about 70% to 90%, by weight. Examples of the dispersants and diluents which may be employed, in addition to those mentioned above, include dioctyl phthalate, dioctyl sebacate, methyl isobutyl ketone, diisobutyl ketone, butyl acetate, ethylhexyl acetate, dicapryl phthalate, tricresyl phosphate, toluene, xylene, naphtha and the like.

It is also within the scope of the present invention to incorporate into my novel compositions such additives, as dyes, pigments, binders, fillers, stabilizers, antioxidants, lubricants, and the like.

THE FOAMED CELLULAR PRODUCTS AND THE PROCESS FOR THE PRODUCTION THEREOF

This invention also relates to various non-flammable, tough, cellular expanded materials which are produced from my novel compositions and which are preferably produced by my novel expansion process, disclosed more fully hereinbelow.

I have found that my novel poly(vinyl chloride)-hexamethoxymethyl melamine compositions may be formed into rigid, non-inflammable, tough, cellular foams by foaming the compositions and contacting the foamed composition with an acid. The foam may then be further treated by heating to further solidify and harden it. This acid contacting step, alone or with the heating step, causes the hexamethoxymethyl melamine content thereof to polymerize, resulting in the formation of a unique foamed material.

Any foaming technique, known to those skilled in the art may be employed to form the foam. However, it should be stressed that foaming procedures which require the application of vigorous heating prior to or before foaming should be avoided since heat will cause the hexamethoxymethyl melamine to cure, i.e., harden, so that it resists foaming. Such foaming procedures as mechanically beating a gas into the poly(vinyl chloride)-hexamethoxymethyl melamine composition or incorporating an alkali metal borohydride with the composition and thereafter foaming it may be employed without causing hardening of the hexamethoxymethyl melamine before foaming occurs.

I have found that alkali metal borohydrides, in aqueous solutions, may advantageously be used to foam my compositions, following procedures set forth in, for example, U.S. Patents 2,909,493, 2,930,770 and 2,930,771. In these processes, the application of a small amount of heat to the alkali metal borohydride-poly(vinyl chloride)-hexamethoxymethyl melamine mixture causes the release of hydrogen from the borohydride which, in turn, causes the resinous composition to foam up.

Although the aqueous solution of the alkali metal borohydride may be used, as such, for the foaming, it is generally preferred to incorporate from about 400 to 1000%, by weight, based on the alkali metal borohydride of an acid activator, such as, e.g., amino acetic acid, aluminum stearate, etc., to initiate the hydrogen release and from 0.1 to 1.0%, by weight, based on total solids content of the mixture, of an emulsifier to insure a completely dispersed and uniform solution of the resin and borohydride. The function of the acid activator is as follows. The alkali metal borohydride is substantially stable to hydrogen release when the aqueous solution is maintained on the alkaline side. However, when the acid initiators are added, the solution becomes slightly acidified and causes the hydrogen to be more quickly and completely released, thereby foaming up the resinous composition.

The foam formed by these known procedures is, according to my novel process, then exposed to a strong acid and preferably, further heated to high temperatures to completely polymerize, i.e., cure or harden, the hexamethoxymethyl melamine content thereof. Acids which may be used for this purpose include the strong inorganic acids, such as HCl, $HNO_3$, $H_2SO_4$, and the like. The amount of acid is not critical, since the foam is contacted with the acid, in the form of an aqueous solution or a gas, until the foam is substantially hard and rigid. This hard and rigid foam is then preferably heated to assure complete polymerization of the hexamethoxymethyl melamine content of the foamed blend and to further harden it. The product of the acid treatment, preferably including the heating step, is the novel rigid, non-inflammable, tough cellular foam of the present invention. It may be used, for example, for insulation purposes, packing and the like.

The following examples are set forth for purposes of illustration only and are not to be construed as limitations on the present invention except as set forth in the appended claims. All parts and percentages are by weight unless otherwise specified.

Example 1

To 100 parts of poly(vinyl chloride) are added 25 parts of hexamethoxymetheyl melamine. The compounds are then charged to and physically admixed on a two-roll rubber mill at 320° F. The resulting composition is removed from the rolls and charged into a closed mold with a 6" x 6" x .075" cavity and pressed 10 minutes at 320° F., cooled and removed. The recovered specimen is 75 mils thick.

Examples 2, 3, 3a and 3b

The procedure of Example 1 is again followed except that 50 parts, 100 parts, 150 parts and 200 parts, respectively, of hexamethoxymethyl melamine are added to 100 parts of the poly(vinyl chloride) resin. Four 75 mil specimens are recovered.

Example 4

A high molecular weight, 100% poly(vinyl chloride) resin is throughly mixed by hand with 75 parts of hexamethoxymethyl melamine to form a mash. The mash is then further blended and fused by working on rubber rolls at 310° F. The resulting plastic mass is cooled, removed from the rolls and sheeted in two ways.

(A) A first portion of the plastic is charged into a closed mold with a 6" x 6" x .075" cavity and pressed 10 minutes at 320° F., cooled and removed. The molded specimen is nominally 75 mils thick.

(B) The remaining portion of the plastic mass is placed between flat, chrome plated plates and pressed to a 10 mil thickness for 3 minutes at 300° F., cooled and removed.

Examples 5–8

In each of these examples the procedure of Example 4 is again followed except that equivalent amount of commercially available dioctyl phthalate, dioctyl sebacate, tricresyl phosphate, and epoxidized polyester (known poly(vinyl chloride) plasticizers) are individually substituted for the hexamethoxymethyl melamine utilized therein. Two specimens of each blend are again recovered.

The properties and comparative results achieved by the utilization of the hexamethoxymethyl melamine of the present invention and the known prior art poly(vinyl chloride) plasticizers are set out in Table I hereinbelow, Examples 1–4 and 5–8 respectively.

CODE FOR TABLES I–IV

V=Very; S=Slight; T=Tacky; SM=Smooth; VB=Very brittle; L=Leathery; PL=Pliable; R=Rigid; RU=Rubbery; P=Purple; A=Amber; HMMM=Hexamethoxymethyl melamine; DOP=Dioctyl phthalate; DOS=Dioctyl sebacate; TCP=Tricresyl phosphate; EPPO=Commercially available epoxidized polyester resin; T[1]=Tack.

TABLE I

| Film from Example No. | 3B | 3A | 3 | 4 | 2 | 1 | 5 | 6 | 7 | 8 |
|---|---|---|---|---|---|---|---|---|---|---|
| Plasticizer, Type | HMMM | HMMM | HMMM | HMMM | HMMM | HMMM | DOP | DOS | TCP | EPPO |
| Plasticizer concentration, percent by wt. | 200 | 150 | 100 | 75 | 50 | 25 | 75 | 75 | 75 | 75 |

| 75 Mil Molded Specimens | | | | | | | | | | |
|---|---|---|---|---|---|---|---|---|---|---|
| Molding Stability, color | P | P | | P | | | A | P | A | A |
| Molding Stability, color, Rank (1=Best) | 5.5 | 5.5 | | 5.5 | | | 1.5 | 5.5 | 3 | 1.5 |
| Hardness, Rex A | 47.5 | 80 | 85 | 95 | 95 | >100 | 75 | 75 | 80 | 77.5 |
| Surface | T | VST[1] | SM | SM | SM | SM | SM | SM | SM | SM |
| Tensile Strength at break, p.s.i. | | 500 | | 4,200 | | | 1,800 | 1,100 | 2,400 | 2,100 |
| Elongation at break, percent | | 1.9 | | 7.3 | | | 350 | 230 | 320 | 390 |
| General Physical Texture-(Flexibility) | VB | L | PL | PL | PU | R | RU | RU | RU | RU |
| Tendency to Burn, Rank (1=Best) | 2 | 2 | 2 | 2 | 2 | 2 | 5.5 | 4 | 2 | 5.5 |

| 10 Mil Pressed Specimens | | | | | | | | | | |
|---|---|---|---|---|---|---|---|---|---|---|
| Pressing Stability, color, Rank (1=Best) | | | | 3 | | | 1.5 | 4 | 5 | 1.5 |
| Change in wt. (weighed before 24 hrs. of drying), percent after 3 days in n-hexane | | | | 0 | | | 35 | 36 | 11 | 13 |
| Liquid resistance (weighed after 24 hrs. of drying), percent extracted in 3 days by— | | | | | | | | | | |
| H₂O | | | | 1.5 | | | 0 | 0 | 0 | 0 |
| n-Hexane | | | | 0 | | | 39 | 43 | 17 | 20 |
| Alcohol | | | | 19 | | | 34 | 42 | 21 | 22 |
| Xylene | | | | 33 | | | 35 | 36 | 35 | 46 |

Example 9

100 parts of dioctyl phthalate and 100 parts of hexamethoxymethyl melamine are blended, individually, with 100 parts of a commercially available low molecular weight 100% poyl(vinyl chloride), on a high speed three-roll mill. The resulting plastisols are knifed on glass, fused at 325° F. and stripped off as films. The results and comparative properties of the two films are set out in Table II below.

TABLE II

| Plasticizer Type | HMMM | DOP |
|---|---|---|
| Plastiizer concentration, percent by weight [1] | 100 | 100 |
| Initial viscosity Brookfield, cp | 36,000 | 1,400 |
| One week viscosity Brookfield, cp | 51,000 | 5,600 |
| Condition | No separation | |
| Film Rex Hardness folded to .125" | 95 | 60 |
| Film Color | Colorless | |
| Film Clarity | Slightly hazy | |
| Flexibility | Soft-leathery | |

[1] Basis=weight of poly(vinyl chloride).

Example 10

Utilizing the procedure of Example 9, plastisols are prepared utilizing in one instance, hexamethoxymethyl melamine, and, in the second instance, a commercially available expoxidized polyester plasticizer. The plastisols are molded into 75 mil thick sheets for 45 minutes at 350° F. Comparative results are set out in Table III, below.

TABLE III

| Plasticizer type | HMMM | EPPO |
|---|---|---|
| Plasticizer concentration, percent by weight [1] | 100 | 45 |
| Heat and light stabilizers, percent by weight: [1] | | |
| Epoxidized polyester | | 5 |
| Ba Cd organic complex | 5 | 3 |
| Triphenyl phosphite | 3 | 1 |
| Molded sheets, 75 mils thick: | 1 | |
| Color | Very pale straw | |
| Clarity | Very slight haze | |
| Hardness, Rex A | 72.5 | 85 |
| Brittle temperature, ° F | 17.5 | −4 |
| Tensile strength at break, p.s.i. | 2,000 | 2,100 |
| Elongation, percent | 330 | 250 |
| Flexibility | Soft-leathery | |

[1] Basis=weight of poly(vinyl chloride).

Example 11

Two mixtures, the first containing 8.33% of poly(vinyl chloride) and 4.17% of hexamethoxymethyl melamine and the second containing 8.33% of poly(vinyl chloride) and 4.17% of dioctyl phthalate are each added to tetrahydrofuran and stirred until dissolved. The resultant solutions each contain 87.5% of the tetrahydrofuran. The resultant solutions are knifed on glass to thin films. Comparative results and properties of the two films are shown in Table IV below.

TABLE IV

| Plasticizer Type | HMMM | DOP |
|---|---|---|
| Plasticizer, percent by weight [1] | 4.17 | 4.17 |
| Tetrahydrofuran, percent by weght [1] | 87.5 | 87.5 |
| Viscosity, Gardner-Holt | J (2.25 poise) | H (2.00 poise) |
| Film Clarity | Excellent | |
| Film Color | Colorless | |
| Film Hardness, Rex A | 85 | 80 |
| Light Resistance | Fair | Good |
| Flexibility | Soft-leathery | |

[1] Basis=weight of poly(vinyl chloride).

Example 12

An organosol of the following composition (parts by weight) is prepared by grinding twice over a high speed three-roll mill:

| | |
|---|---|
| Poly(vinyl chloride) | 100 |
| Hexamethoxymethyl melamine | 100 |
| Xylene | 40 |
| Aluminum stearate | 10 |
| Dibasic lead stearate | 25 |
| Amino acetic acid | 15 |
| Polyoxyethylene sorbitan monolaurate | 0.8 |

The following solution is then thoroughly stirred into the above prepared organosol:

| | |
|---|---|
| Sodium borohydride | 5 |
| Water at pH 10 | 10 |

The resultant blend is then foamed by warming it for 30 minutes at 102° C. The product is a white, semi-rigid foam of good texture and uniformity. However, it loses its compressive strength rapidly when heated, burns readily and has a density of only 7.4 pounds per cubic feet. After drying, a 100 ml. block of the foam is exposed for 24 hours to fumes of hydrochloric acid. The foam becomes rigid and much stronger. It is then heated for 1 hour at 163° C. to complete the polymerization of the hexamethoxymethyl melamine initiated by the acid. The final block is a purple to black foam of greatly enhanced strength. It is fire resistant and now has a density of 9.1 lbs./cubic foot.

I claim:
1. A composition of matter comprising poly(vinyl chloride) having in admixture therewith from about 50% to 150%, by weight, based on the weight of the poly(vinyl chloride), of hexamethoxymethyl melamine.
2. A composition of matter which comprises poly(vinyl chloride) having in admixture therewith from about 75% to 125%, by weight, based on the weight of the poly(vinyl chloride), of hexamethoxymethyl melamine.
3. A composition of matter comprising poly(vinyl chloride) having in admixture therewith from about 50% to 150% by weight, based on the weight of poly(vinyl chloride), of hexamethoxymethyl melamine and at least one plasticizer.
4. A composition of matter comprising poly(vinyl chloride) having in admixture therewith from about 50% to 150%, by weight, based on the weight of the poly(vinyl chloride), of hexamethoxymethyl melamine and at least one compound selected from the group consisting of an organic dispersant and a hydrocarbon diluent.
5. A non-inflammable, tough, cellular, expanded foam of poly(vinyl chloride) having in admixture therewith from about 50% to 150%, by weight, based on the weight of the poly(vinyl chloride), of hexamethoxymethyl melamine.
6. A non-inflammable, tough, cellular, expanded foam of poly(vinyl chloride) having in admixture therewith from about 75% to 125%, by weight, based on the weight of the poly(vinyl chloride), of hexamethoxymethyl melamine.

References Cited by the Examiner

UNITED STATES PATENTS

| | | | |
|---|---|---|---|
| 2,624,682 | 1/53 | Hazeltine | 117—15 |
| 2,906,724 | 9/59 | Daniel | 260—858 |
| 2,919,206 | 12/59 | Malmquist | 117—76 |
| 2,946,095 | 7/60 | Beer | 260—2.5 |
| 2,998,411 | 8/61 | Housekeeper | 260—67.6 |
| 3,036,029 | 5/62 | Chapin | 260—854 |
| 3,062,682 | 11/62 | Morgan et al. | 260—2.5 |
| 3,107,227 | 10/63 | Suen et al. | 260—856 |

MURRAY TILLMAN, *Primary Examiner.*

LEON J. BERCOVITZ, *Examiner.*